US012279302B2

(12) United States Patent
Shahidi et al.

(10) Patent No.: US 12,279,302 B2
(45) Date of Patent: Apr. 15, 2025

(54) TECHNIQUES FOR PRIORITIZING COMMUNICATIONS FOR DUAL SUBSCRIBER USER EQUIPMENT

(71) Applicant: QUALCOMM Incorporated, San Diego, CA (US)

(72) Inventors: Reza Shahidi, San Diego, CA (US); Qingxin Chen, San Diego, CA (US); Lan Lan, San Diego, CA (US); Yong Xie, San Diego, CA (US); Carlos Marcelo Dias Pazos, Carlsbad, CA (US); James Beckman, La Jolla, CA (US); Cheol Hee Park, San Diego, CA (US); Leena Zacharias, San Jose, CA (US); Arnaud Meylan, San Diego, CA (US); Shanshan Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/654,363

(22) Filed: Mar. 10, 2022

(65) Prior Publication Data
US 2022/0295543 A1    Sep. 15, 2022

Related U.S. Application Data

(60) Provisional application No. 63/159,816, filed on Mar. 11, 2021.

(51) Int. Cl.
*H04W 74/00* (2009.01)
*H04L 47/6275* (2022.01)
(Continued)

(52) U.S. Cl.
CPC ....... *H04W 74/002* (2013.01); *H04L 47/6275* (2013.01); *H04W 8/183* (2013.01);
(Continued)

(58) Field of Classification Search
CPC .................. H04B 1/406; H04L 1/1812; H04L 1/1816–1819; H04L 47/6215;
(Continued)

(56) References Cited

U.S. PATENT DOCUMENTS

| 8,526,946 B2 | 9/2013 | Pattaswamy et al. |
| 9,137,687 B2 | 9/2015 | Gottimukkala et al. |

(Continued)

FOREIGN PATENT DOCUMENTS

| CN | 110692263 A | 1/2020 |
| CN | 113423106 A | 9/2021 |

(Continued)

OTHER PUBLICATIONS

International Search Report and Written Opinion—PCT/US2022/071100—ISA/EPO—Sep. 1, 2022.

(Continued)

*Primary Examiner* — Thomas R Cairns
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may initiate a first service associated with a first subscriber identity module (SIM) of the UE and a first priority. The UE may initiate a second service associated with a second SIM of the UE and a second priority. The UE may switch the first priority and the second priority during at least part of the first service or the second service. The UE may perform a communication in accordance with at least one of the first priority or the second priority. Numerous other aspects are described.

30 Claims, 8 Drawing Sheets

(51) Int. Cl.
  *H04W 8/18* (2009.01)
  *H04W 8/20* (2009.01)
  *H04W 74/0833* (2024.01)
  *H04W 88/06* (2009.01)

(52) U.S. Cl.
  CPC ......... *H04W 8/20* (2013.01); *H04W 74/0833* (2013.01); *H04W 88/06* (2013.01)

(58) Field of Classification Search
  CPC .. H04L 47/6275; H04L 65/1016; H04W 8/18; H04W 8/183; H04W 8/20; H04W 8/205; H04W 48/18; H04W 60/005; H04W 74/008; H04W 74/0833; H04W 88/06; H04W 4/002; H04W 4/0833; Y02D 30/70
  See application file for complete search history.

(56) References Cited

U.S. PATENT DOCUMENTS

| | | | |
|---|---|---|---|
| 10,187,781 B2 | 1/2019 | Kumar et al. | |
| 10,980,001 B2 | 4/2021 | Huang et al. | |
| 11,558,733 B2 | 1/2023 | Baskar et al. | |
| 2012/0264473 A1 | 10/2012 | Mujtaba et al. | |
| 2013/0316718 A1* | 11/2013 | Hsu | H04W 72/20 455/450 |
| 2014/0200046 A1 | 7/2014 | Sikri et al. | |
| 2014/0213210 A1 | 7/2014 | Li et al. | |
| 2014/0228039 A1 | 8/2014 | Zhao et al. | |
| 2014/0370892 A1 | 12/2014 | Gottimukkala et al. | |
| 2015/0011236 A1 | 1/2015 | Kazmi et al. | |
| 2015/0071088 A1 | 3/2015 | Gottimukkala et al. | |
| 2015/0295692 A1* | 10/2015 | Gowda | H04L 1/1854 370/336 |
| 2015/0304963 A1 | 10/2015 | Mitra et al. | |
| 2015/0381291 A1 | 12/2015 | Mahajan et al. | |
| 2016/0049976 A1 | 2/2016 | Krishnamoorthi et al. | |
| 2016/0099684 A1 | 4/2016 | Qiu et al. | |
| 2016/0134317 A1 | 5/2016 | Hu et al. | |
| 2016/0278128 A1 | 9/2016 | Krishnamurthy | |
| 2016/0330653 A1 | 11/2016 | Yang et al. | |
| 2017/0026876 A1 | 1/2017 | Yang et al. | |
| 2017/0180550 A1 | 6/2017 | Geo et al. | |
| 2017/0208494 A1 | 7/2017 | Moon et al. | |
| 2017/0223313 A1 | 8/2017 | Chong et al. | |
| 2017/0223589 A1 | 8/2017 | Lee et al. | |
| 2018/0084601 A1 | 3/2018 | Dhanapal et al. | |
| 2018/0176887 A1 | 6/2018 | Strobl | |
| 2018/0184309 A1 | 6/2018 | Bhardwaj et al. | |
| 2018/0234878 A1 | 8/2018 | Anand et al. | |
| 2018/0234916 A1 | 8/2018 | Song et al. | |
| 2018/0242192 A1 | 8/2018 | Zhao et al. | |
| 2018/0270649 A1 | 9/2018 | Tsai et al. | |
| 2018/0338284 A1 | 11/2018 | Maheshwari et al. | |
| 2019/0199413 A1 | 6/2019 | Sundararajan et al. | |
| 2019/0364492 A1 | 11/2019 | Azizi et al. | |
| 2020/0336891 A1* | 10/2020 | Guo | H04W 8/20 |
| 2021/0029773 A1 | 1/2021 | Majumder et al. | |
| 2021/0266058 A1 | 8/2021 | Yu et al. | |
| 2021/0400599 A1 | 12/2021 | Gopal | |
| 2022/0007171 A1 | 1/2022 | Wang | |
| 2022/0103214 A1 | 3/2022 | Gopal et al. | |
| 2022/0150788 A1* | 5/2022 | Jiang | H04W 36/30 |
| 2022/0232367 A1 | 7/2022 | Gopal et al. | |
| 2023/0078016 A1 | 3/2023 | Gopal et al. | |
| 2023/0370833 A1 | 11/2023 | Zhang | |
| 2024/0089918 A1 | 3/2024 | Shrivastava et al. | |

FOREIGN PATENT DOCUMENTS

| | | |
|---|---|---|
| EP | 2302973 A1 | 3/2011 |
| EP | 2515593 A2 | 10/2012 |
| WO | 2015160457 A1 | 10/2015 |
| WO | 2016122773 A1 | 8/2016 |
| WO | 2020125839 A1 | 6/2020 |
| WO | 2020247043 A1 | 12/2020 |
| WO | 2021253966 A1 | 12/2021 |

OTHER PUBLICATIONS

Partial International Search Report—PCT/US2022/071100—ISA/EPO—Jul. 11, 2022.

Jung G., et al., "Performance Improvements of Universal Mobile Telecommunications System Enhanced Uplink Using Mitigation Scheme in Single Tx and Dual Rx Dual-SIM Dual-Active Devices", IET, Electronics Letters, vol. 51, No. 25, pp. 2160-2162, Dec. 10, 2015, 2 pages.

* cited by examiner

TECHNIQUES FOR PRIORITIZING COMMUNICATIONS FOR DUAL SUBSCRIBER USER EQUIPMENT

CROSS-REFERENCE TO RELATED APPLICATION

This patent application claims priority to U.S. Provisional Patent Application No. 63/159,816, filed on Mar. 11, 2021, entitled "TECHNIQUES FOR PRIORITIZING COMMUNICATIONS FOR DUAL SUBSCRIBER USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for prioritizing communications for dual subscriber user equipment.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes initiating a first service associated with a first subscriber identity module (SIM) of the UE and a first priority; initiating a second service associated with a second SIM of the UE and a second priority; switching the first priority and the second priority during at least part of the first service or the second service; and performing a communication in accordance with at least one of the first priority or the second priority. Thus, the first service and the second service are both prioritized at different times in a time window, which reduces the likelihood of link starvation or failure for a lower priority service of the first service and the second service.

In some aspects, switching the first priority and the second priority is based at least in part on the first service being a voice service, and a time window of the first priority is configured to include a transmission time of a packet for the voice service. Thus, a voice service, which is generally higher priority and associated with periodic transmissions, is allocated a higher priority during a time window in which the periodic transmissions are likely to occur, thereby improving reliability of the voice service.

In some aspects, the time window of the first priority is based at least in part on information regarding the voice service provided by an Internet Protocol Multimedia Subsystem of the UE.

In some aspects, the priority pattern is based at least in part on the first service being a voice service, and the method further comprises: modifying a duration of a time window of the first priority based at least in part on hybrid automatic repeat request (HARQ) feedback regarding the voice service.

In some aspects, the duration of the time window is lengthened to include a retransmission of a communication associated with the first SIM. Thus, the retransmission is prioritized, which increases reliability of the retransmission.

In some aspects, the duration of the time window is shortened based at least in part on a communication associated with the first SIM being an initial transmission. Thus, communications of the second SIM can be prioritized for a longer duration when retransmissions are unlikely, which improves throughput of the second SIM.

In some aspects, the first service is prioritized over the second service based at least in part on the first priority being higher than the second priority and based at least in part on neither of the first service and the second service being voice services.

In some aspects, a time window associated with the first priority occupies a greater period of a time interval associated with the first service or the second service than a time window associated with the second priority based at least in part on the priority being higher than the second priority.

In some aspects, switching the first priority and the second priority is based at least in part on the first service being associated with a default data SIM of the UE.

In some aspects, the first time window and the second time window occupy equal portions of a period of the priority pattern based at least in part on the first priority and the second priority being equal to each other.

In some aspects, the method includes transmitting a random access message, associated with the second SIM, during a time window associated with the first priority.

In some aspects, the second priority is higher than the first priority, and the random access message associated with the second SIM is prioritized over a concurrent random access message associated with the first SIM.

In some aspects, the random access message associated with the second SIM is prioritized over a concurrent random access message associated with the first SIM based at least in part on a priority of the random access message associated with the second SIM being unknown, and based at least in part on the random access message associated with the second SIM arriving before the random access message associated with the first SIM.

In some aspects, a UE for wireless communication includes a memory and one or more processors, coupled to the memory, configured to: initiate a first service associated with a first SIM of the UE and a first priority; initiate a second service associated with a second SIM of the UE and a second priority; switch the first priority and the second priority during at least part of the first service or the second service; and perform a communication in accordance with at least one of the first priority or the second priority.

In some aspects, a non-transitory computer-readable medium storing a set of instructions for wireless communication includes one or more instructions that, when executed by one or more processors of a UE, cause the UE to: initiate a first service associated with a first SIM of the UE and a first priority; initiate a second service associated with a second SIM of the UE and a second priority; switch the first priority and the second priority during at least part of the first service or the second service; and perform a communication in accordance with at least one of the first priority or the second priority.

In some aspects, an apparatus for wireless communication includes means for initiating a first service associated with a first SIM of the apparatus and a first priority; means for initiating a second service associated with a second SIM of the apparatus and a second priority; means for switching the first priority and the second priority during at least part of the first service or the second service; and means for performing a communication in accordance with at least one of the first priority or the second priority.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
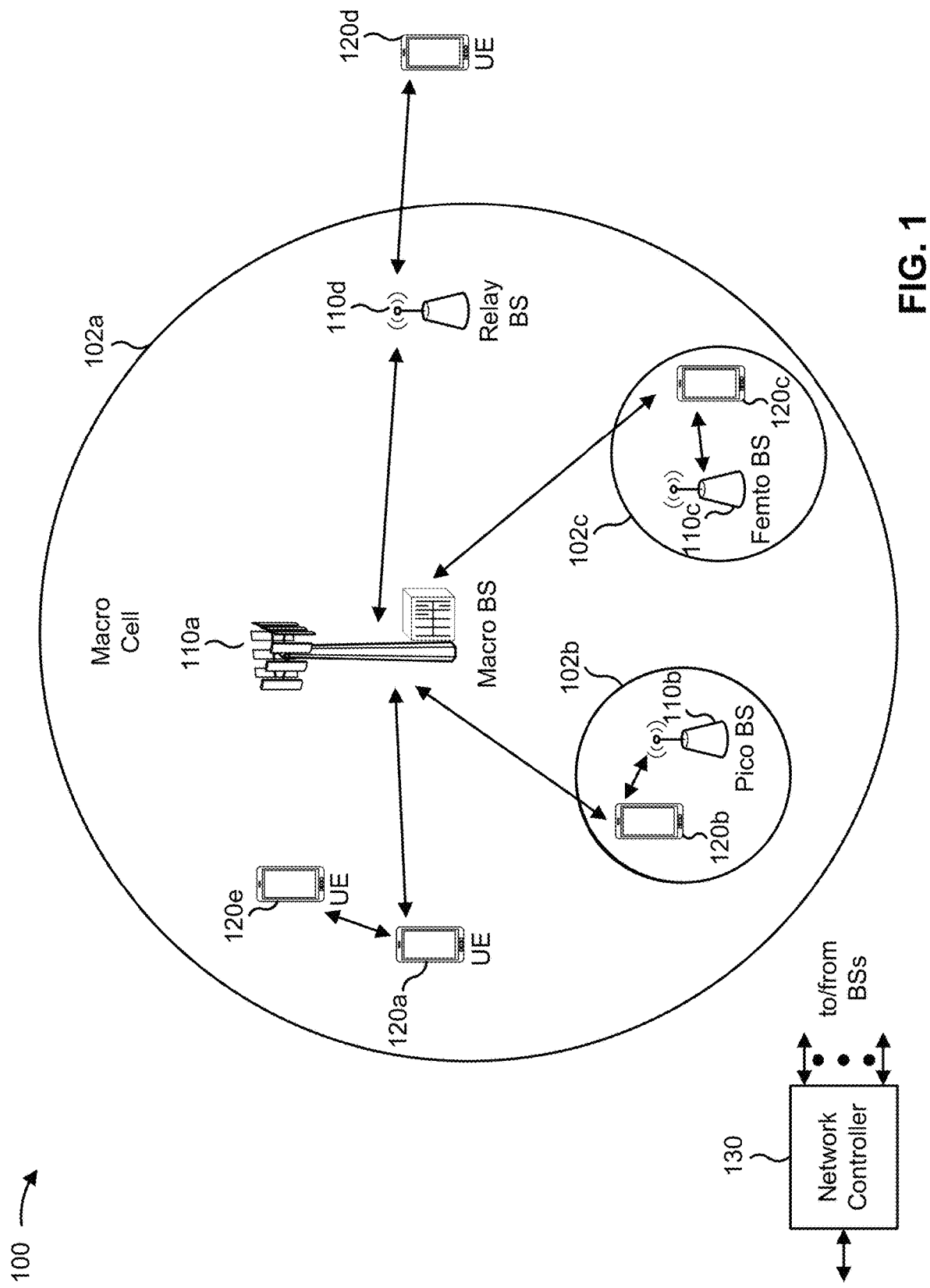
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
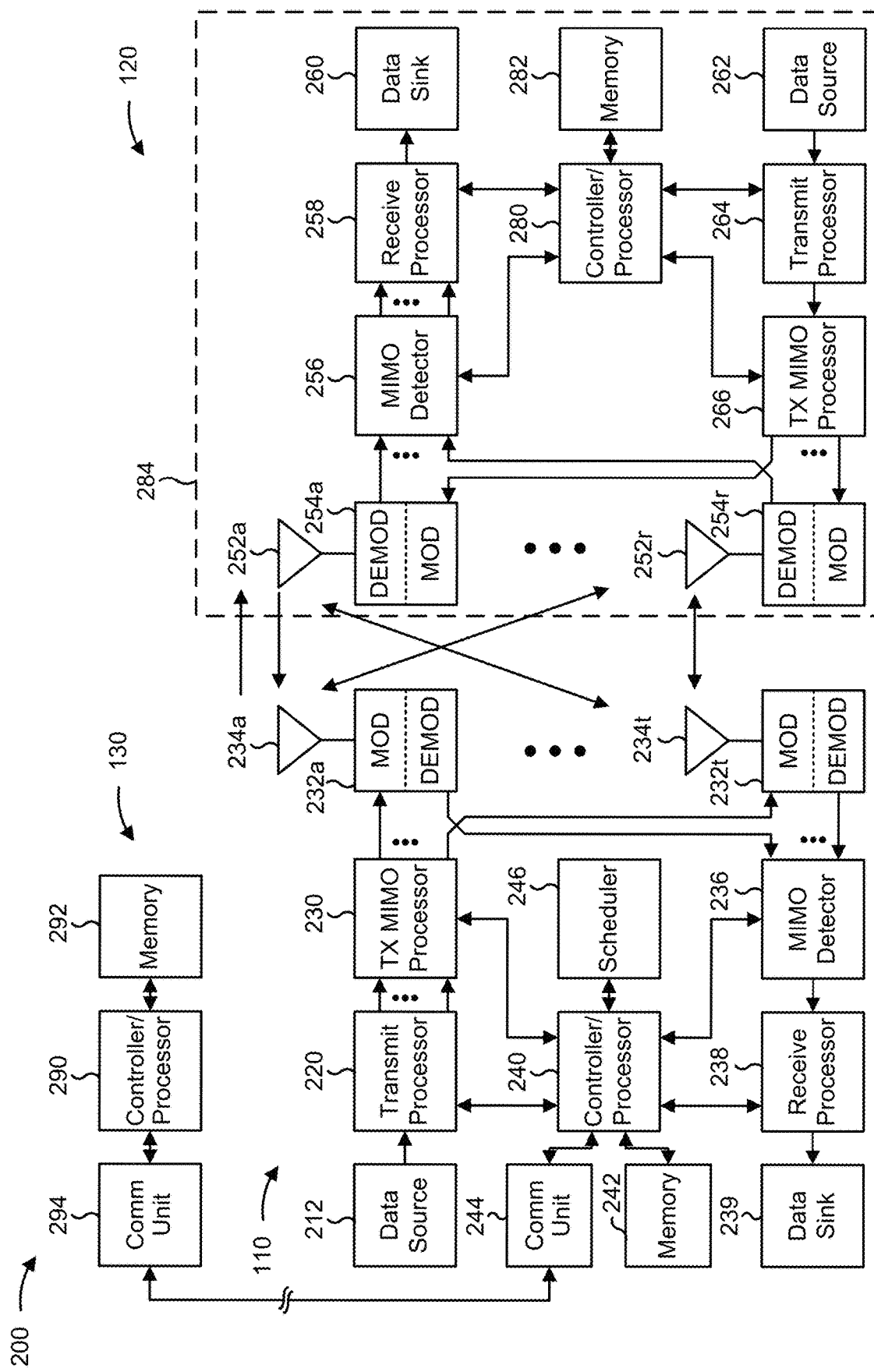
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with prioritizing communications for dual subscriber user equipment, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, and/or other processes as described herein. In some aspects, executing instructions may include running the instructions, converting the instructions, compiling the instructions, and/or interpreting the instructions.

In some aspects, the UE includes means for initiating a first service associated with a first SIM of the UE and a first priority; means for initiating a second service associated with a second SIM of the UE and a second priority; means for switching the first priority and the second priority during at least part of the first service or the second service; and/or means for performing a communication in accordance with at least one of the first priority or the second priority. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for modifying a duration of a time window of the first priority based at least in part on hybrid automatic repeat request (HARQ) feedback regarding the voice service.

In some aspects, the UE includes means for transmitting a random access message, associated with the second SIM, during a time window associated with the first priority.

As indicated above, FIG. 2 is provided as an example. Other examples may differ from what is described with regard to FIG. 2.

Figure 3:
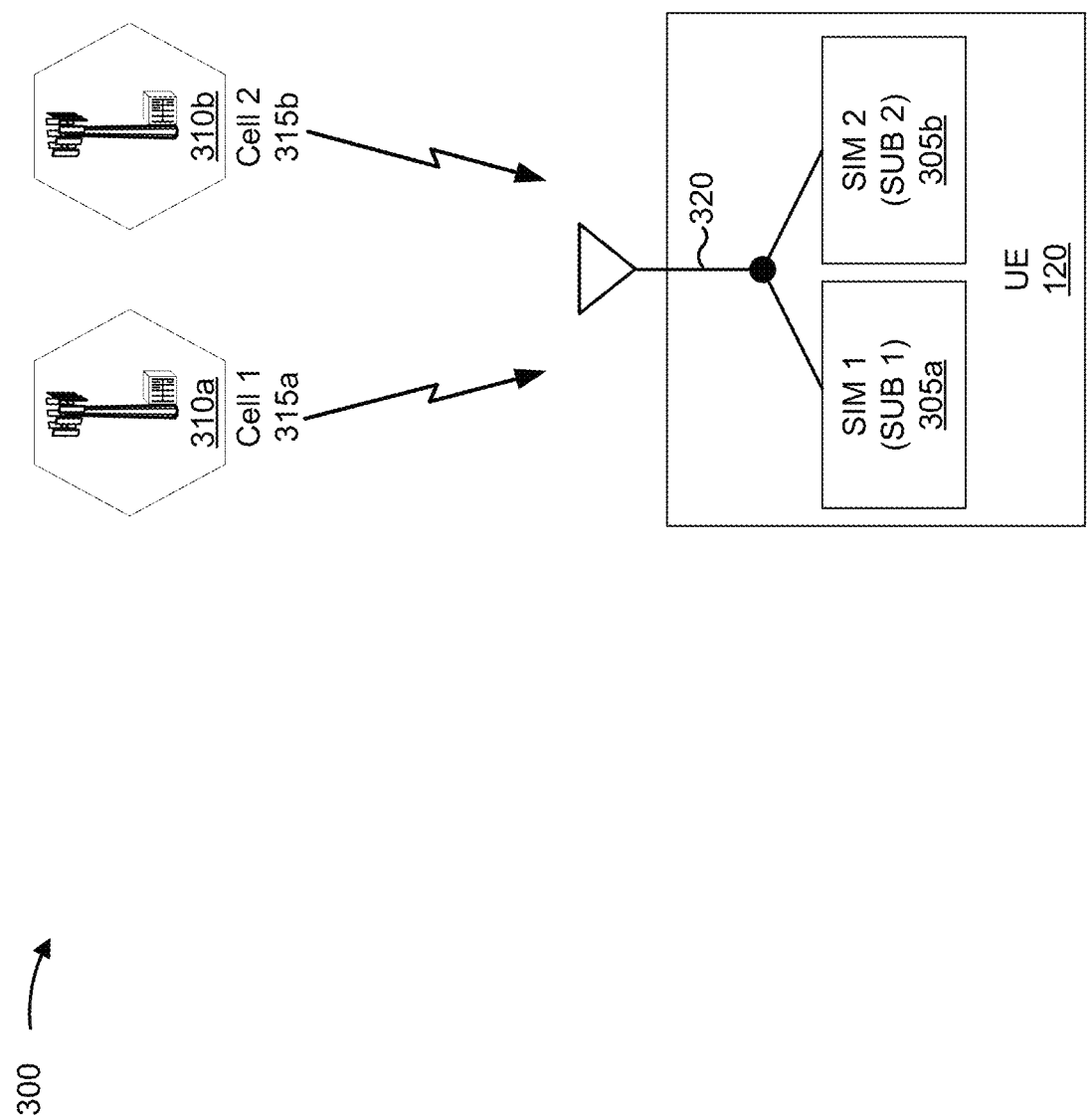
FIG. 3 is a diagram illustrating an example of a multiple subscriber identity module (multi-SIM) UE, in accordance with the present disclosure.

FIG. 3 is a diagram illustrating an example 300 of a multiple subscriber identity module (multi-SIM) UE, in accordance with the present disclosure. As shown in FIG. 3, a UE 120 may be a multi-SIM UE that includes multiple SIMS (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, a video telephony service, or a gaming service, among other examples. Some of these services may be associated with Quality of Service (QoS) requirements, so associated traffic may be associated with a QoS level. Others of these services may not be associated with QoS requirements, so associated traffic may not be associated with a QoS level, or may be associated with a best-effort QoS level.

As further shown in FIG. 3, the UE 120 may communicate (for example, in a connected mode, an idle mode, or an inactive mode) with a first base station 310a via a first cell 315a (shown as Cell 1) using the first SIM 305a. In this case, a first subscription (SUB 1) of the UE 120 may be used to access the first cell 315a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using the second SIM 305b. In this case, a second subscription (SUB 2) of the UE 120 may be used to access the second cell 315b (for example, using a second IMSI for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be a single receiver (abbreviated "SR" in this context) (sometimes also referred to as single radio) multi-SIM UE, such as an SR multi-SIM multiple standby (SR-MSMS) UE, a single receiver dual SIM dual standby (SR-DSDS) UE, or a dual SIM dual active (DSDA) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. A DSDA UE may be capable of communicating on two connections at a given time, such as for multiple communications associated with different RATs or multiple communications of a single RAT. However, hardware limitations of some UEs may limit the DSDA UE to performing a single call at a given time because radio frequency resources of the UE are shared between the multiple subscriptions. For example, a DSDA UE may be associated with multiple subscriptions but may include only a single transceiver shared by the multiple subscriptions, a single transmit chain shared by the multiple subscriptions, a single receive chain shared by the multiple subscriptions, a baseband processing capability that only supports a single call, or a power-limited scenario, among other examples. For example, these limitations may be caused by a limited hardware resource, a limited transmit power, transmitter sharing, full concurrency power sharing, radio frequency (RF) coexistence, or the like. Such limitations on the transmit resources of the UE are indicated, in a general sense, by reference number 320.

In a multi-SIM mode such as a DSDA mode, a default data SIM (DDS) subscriber may perform data activity, call activity, or the like. A non-DDS (nDDS) subscriber may perform call-related activity, small data activity (e.g., short message service (SMS) activity or multimedia message service (MMS) activity), or similar tasks. "Subscriber" is used interchangeably with "SIM" herein. Such activity may be associated with a service.

In some cases, a first service associated with a first SIM and a second service associated with a second SIM may be concurrently active. While the first service and the second service are concurrently active, the UE may be in a transmit resource limited state, such as based at least in part on full concurrency power sharing, transmitter sharing, or the like. In the transmit resource limited state, a priority handling scheme may be used to allocate the limited transmit resources of the UE for transmissions associated with the first service or transmissions associated with the second service, so that transmit resources of the UE are not overbooked. Typically, a priority handling scheme is a subscription service priority scheme, in which priority is allocated to one service or the other service based at least in part on a priority associated with the one service (or the first SIM) or the other service (or the second SIM). In other words, in a subscription service priority scheme, priority may be allocated to a higher-priority service any time there is a conflict between a transmission of the higher-priority service and a transmission of a lower-priority service.

The usage of the subscription service priority scheme may lead to disproportionate impact on the lower-priority service. For example, transmissions associated with the higher-priority service may tend to be transmitted more frequently than transmissions associated with the lower-priority service. The prioritization of the higher-priority service without regard to the lower-priority service's traffic may lead to diminished throughput on the lower-priority service, failure to meet QoS requirements of the lower-priority service, and radio link failure on the connection associated with the lower-priority service.

Some techniques and apparatuses described herein provide a priority handling scheme for a DSDA UE in which prioritization is switched between a higher-priority service (or a higher-priority SIM) and a lower-priority service (or a lower-priority SIM). Each active service may be associated with higher priority time windows and lower priority time windows. In a higher priority time window for a given service, transmissions associated with the given service are prioritized over transmissions associated with other services (in the case of a conflict between such transmissions). In a lower priority time window for the given service, transmissions associated with the given service are deprioritized relative to transmissions associated with other services, and are transmitted only if no conflict occurs with a higher priority transmission of another service. In this way, the length of time in which any given service's transmissions are deprioritized is reduced, thereby improving throughput and QoS requirement satisfaction, and reducing the likelihood of radio link failure for a deprioritized service. In some aspects, the arrangement of higher priority time windows and lower priority time windows for a group of services may be referred to herein as a micro priority pattern (MPP). In some aspects, the arrangement of higher priority time windows and lower priority time windows for a group of services may be periodic.

A periodic arrangement of higher priority time windows and lower priority time windows (sometimes referred to herein as a priority configuration and described in more detail in connection with FIG. 4) may be particularly useful for some combinations of services. For example, the priority configuration may be different for different services. One use case is for a voice service concurrent with a gaming service. For example, a vocoder of a voice service may generate voice frames with a fixed rate and periodicity, so the priority configuration can take advantage of the periodic property (such as based at least in part on information from an Internet Protocol (IP) Multimedia Subsystem (IMS) control component). For example, the priority configuration may ensure that a high priority voice service's packets are successfully transmitted in a higher priority time window, and may then allocate a lower priority time window to the voice service so that the gaming service's communications can be transmitted in a concurrent higher priority time window for the gaming service. This is described in more detail in connection with FIG. 4.

As indicated above, FIG. 3 is provided as an example. Other examples may differ from what is described with regard to FIG. 3.

Figure 4:
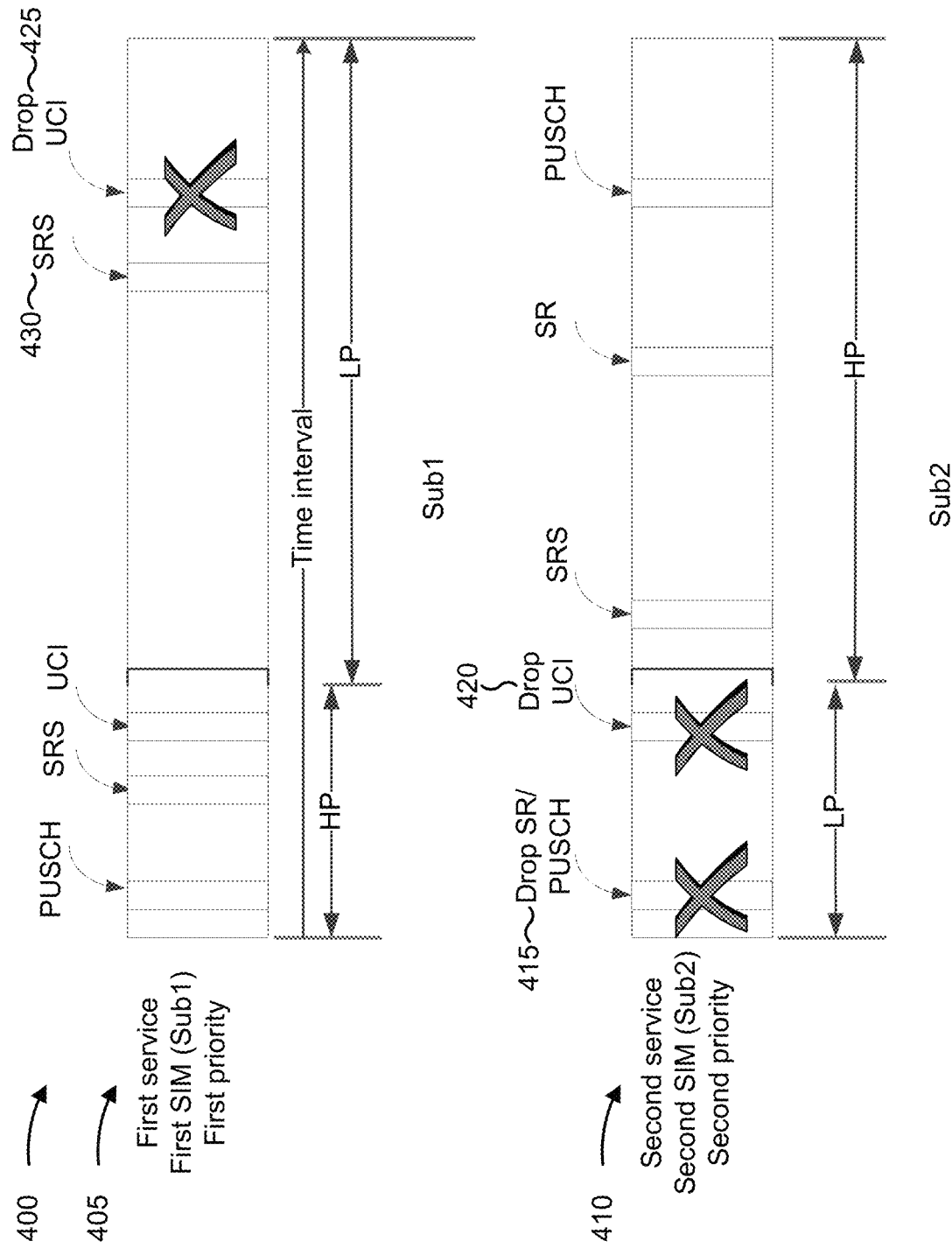
FIG. 4 is a diagram illustrating an example of a priority configuration for a dual SIM dual active (DSDA) UE, in accordance with the present disclosure.

FIG. 4 is a diagram illustrating an example 400 of a priority configuration for a DSDA UE, in accordance with the present disclosure. Example 400 relates to a first service associated with a first SIM and a first priority, shown by reference number 405, and a second service associated with a second SIM and a second priority, shown by reference number 410. A UE may initiate the first service and the second service. The UE may determine that the first service is associated with a first priority and the second service is associated with a second priority. In a subscription service priority scheme, in case of conflicting transmissions, the UE would prioritize transmissions associated with whichever priority, of the first priority or the second priority, is higher. Thus, the UE would cancel each transmission of the lower priority service that conflicts with a transmission of the higher priority service, which leads to diminished throughput and diminished QoS performance on the lower priority service.

Techniques and apparatuses described herein introduce a priority configuration based at least in part on higher priority time windows (indicated in FIG. 4 by "HP") and lower priority time windows (indicated in FIG. 4 by "LP"). A higher priority time window for a given SIM is a window in which the given SIM always gets priority for resource allocation or transmission when in conflict with a transmission from another service, if a time window for the other service is a lower priority time window at the time of the conflict. "Resource allocation" can be based at least in part on hardware resource limitation, power allocation management, and so on. A lower priority time window for a given SIM is a window in which the given SIM will not receive priority for resource allocation when in conflict with a transmission from another service in a higher priority time window. However, even in a lower priority time window, a SIM may have opportunities to transmit when there is no conflict with a transmission having a higher priority time window.

As further shown, the higher priority time windows and the lower priority time windows may be implemented within a time interval. For example, the UE may switch the higher priority time windows and the lower priority time windows in the time interval. In some aspects, the time interval may be periodic, so the arrangement of higher priority time windows and lower priority time windows shown in example 400 may repeat, for example, during the duration of the first service and/or the second service. Generally, it can be seen that the higher priority time windows and the lower priority time windows are inverted with regard to the first service and the second service. For example, when the first service has a higher priority time window, the second service has a lower priority time window, and vice versa.

In example 400, conflicts occur at reference numbers 415, 420, and 425. The conflict at reference number 415 is between a physical uplink shared channel (PUSCH) associated with the first service during a higher priority time window of the first service and a scheduling request (SR) and/or PUSCH associated with the second service during a lower priority time window of the second service, so the SR/PUSCH associated with the second service is dropped. The conflict at reference number 420 is between uplink control information (UCI) associated with the first service during a higher priority time window of the first service and UCI associated with the second service during a lower priority time window of the second service, so the UCI associated with the second service is dropped. The conflict at reference number 425 is between UCI associated with the first service during a lower priority time window of the first service and a PUSCH associated with the second service during a higher priority time window of the second service, so the UCI associated with the first service is dropped. It can be seen, such as at reference number 430, that if no conflict occurs with a transmission in a higher priority time window, then a service can transmit in a lower priority time window.

In some aspects, the determination of the higher priority time windows and the lower priority time windows may be based at least in part on (e.g., driven by) the combination of services associated with the first SIM and the second SIM. This is described in more detail in connection with FIG. 5.

As indicated above, FIG. 4 is provided as an example. Other examples may differ from what is described with regard to FIG. 4.

Figure 5:
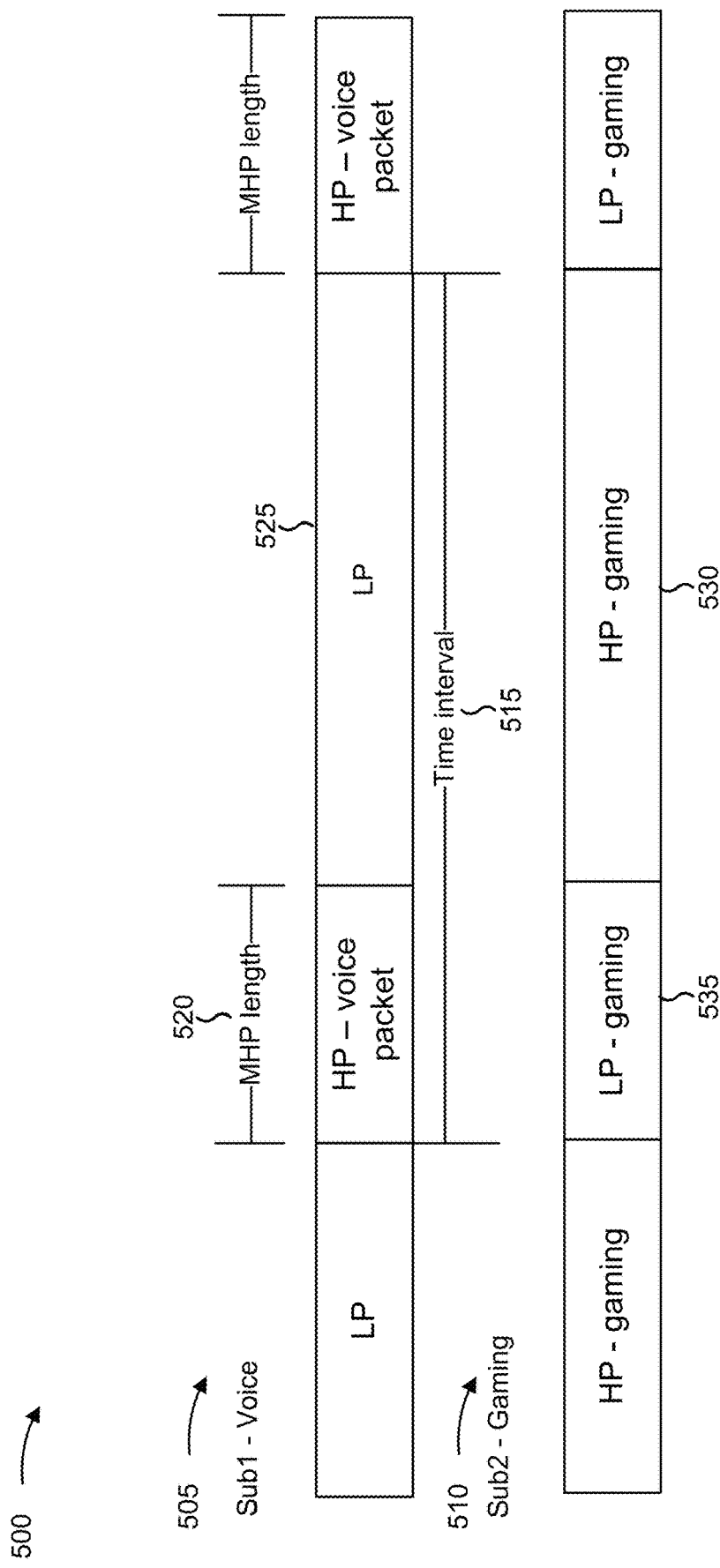
FIG. 5 is a diagram illustrating an example of a priority configuration for a DSDA UE associated with a voice service and a gaming service, in accordance with the present disclosure.

FIG. 5 is a diagram illustrating an example 500 of a priority configuration for a DSDA UE associated with a voice service and a gaming service, in accordance with the present disclosure. Example 500 relates to a first service associated with a first SIM (Sub1), shown by reference number 505, and a second service associated with a second SIM (Sub2), shown by reference number 510. Here, the first service is a voice service and the second service is a gaming service. A UE may initiate the first service and the second service. The voice service may be managed by an IMS component of the UE. For example, the IMS component may have information regarding a length of voice packets, a periodicity of voice packets, an amount of data conveyed per voice packet, and/or other parameters associated with the voice service.

The UE may determine the priority configuration (e.g., the length of the time interval 515, the lengths of the higher priority time window 520 and the lower priority time window 525 for the first service, and the lengths of the higher priority time window 530 and the lower priority time window 535 for the second service) based at least in part on information regarding the voice service provided by the IMS component. For example, based at least in part on a voice call being connected and/or active, the IMS component may configure (e.g., for a lower layer of the UE) priority information used to determine a higher-priority time window for the voice call. Packets (e.g., real-time transport protocol (RTP) packets) of the voice call may be transmitted within the higher-priority time window. For example, the UE may determine the priority configuration such that the higher-priority time window occurs when such packets are to be transmitted. Thus, the voice call may be prioritized (e.g., take precedence) over transmissions of a service associated with a non-active call (e.g., no call, or a call on hold).

Thus, the determination of the priority configuration may be driven by the voice service, and may be controlled by the IMS component. A subscriber that selects the time placement of the higher priority time window of the subscriber may be referred to herein as a master subscriber. In the above example, the subscriber associated with the voice service may be a master subscriber for purposes of determination of the priority configuration. For example, the voice service may be allocated a higher priority time window during a time in which a packet (e.g., a voice packet) is expected to be transmitted at a transmission time (based at least in part on a periodicity of voice packets and a length of voice packets) and may be allocated a lower priority time window during a time in which a voice packet is not expected to be transmitted. The non-voice service (e.g., the gaming service), which does not drive the determination of the priority configuration, may be allocated a lower priority time window and a higher priority time window that inverts the priority configuration of the voice service, as shown in FIG. 5. In some aspects, if the non-voice service is associated with a higher priority than the voice service, the non-voice service may be allocated a longer higher priority time window than if the non-voice service is associated with a lower priority than the voice service.

In some aspects, the determination of the priority configuration may be based at least in part on feedback regarding the voice call. For example, the priority configuration (e.g., the first priority and/or the second priority, the length of the higher priority time window, the length of the lower priority time window, or the like) may be adjusted based at least in part on a voice transmission status. The UE may track or estimate a voice transmission status based at least in part on a HARQ retransmission status for the voice call (e.g., for the SIM associated with the voice call) in order to terminate or shorten a higher priority time window (if a transmission associated with the voice call is an initial transmission) or lengthen the higher priority time window (e.g., to include a retransmission of a packet associated with the voice call).

If neither the first service nor the second service is a voice service, and if both the first service and the second service are in connected mode (e.g., have been initiated), then the UE may determine the priority configuration for the first service and the second service based at least in part on respective priorities of the first service and the second service. For example, if the first priority of the first service is higher than the second priority of the second service, then the determination of the priority configuration may be driven by the first service. In some examples, the priority configuration can be that a higher priority time window is associated with a larger priority based time allocation for the first service than for the second service in the time interval of the priority configuration. The larger priority based time allocation for the higher priority time window may mean that the higher priority time window for the first service occupies a greater period of the time interval than the higher priority time window for the second service. Thus, the higher priority time window may be longer than the lower priority time window. Then, the lower priority service (e.g., the second service in this example) may be allocated a lower priority time window and a higher priority time window that inverts the priority configuration of the first service.

In some aspects, if neither the first service nor the second service is a voice service or both the first service and the second service are voice services, and if both the first service and the second service are in connected mode (e.g., have been initiated), the priority configuration may be determined based at least in part on a master subscriber. In some examples, the master subscriber can be selected as a subscriber having a higher priority service. In some other examples, the master subscriber may be selected as a lower priority subscriber (e.g., associated with a lower priority service) and may be allocated a shorter high priority time window. Thus, the lower priority subscriber can configure the high priority time window to align with the lower priority subscriber's communications, and a longer high priority window can be provided to the higher priority subscriber. For example, the higher priority subscriber may be allocated a 30 millisecond (ms) high priority time window out of a 40 ms time interval, and the lower priority (master) subscriber may be allocated a 10 ms high priority time window out of the 40 ms time interval.

If the first service and the second service have been initiated, are not voice services, and have equal priorities, then the UE may determine the priority configuration for the first service and the second service based at least in part on a DDS of the first SIM and the second SIM. For example, if the first service is associated with a DDS, then the determination of the priority pattern may be driven by the first service, and the higher priority time window and the lower priority time window may have equal lengths (e.g., equal priority based time allocations). In some aspects, the higher priority time window may be allocated to correspond to expected active times associated with the first service. Then, the non-DDS service (e.g., the second service in this example) may be allocated a lower priority time window and a higher priority time window that inverts the priority configuration of the first service. In some examples, the first service and the second service may have higher priority time windows of equal length (e.g., may occupy equal portions of a period of the time interval) based at least in part on the priorities of the first service and the second service being equal to each other.

In some aspects, the UE may select a master subscriber. For example, the UE may select a master subscriber based at least in part on a first condition and/or a second condition. In some aspects, the selection of the master subscriber (that is, the determination of the priority configuration) may be based at least in part on timing of scheduling request (abbreviated in this context as "SR," though SR is used in other contexts herein as an abbreviation of "single radio" or "single receiver") occasions. An example of the first condition and the second condition is provided in the below pseudocode:

Define X=nDDS_SR_occasions mod cycle_length−delta_ms and assume voice high priority time window envelope is 10 ms.
        Step 1: Select X as new HIGH_PRIO_START (new_nDDS_HIGH_PRIO_START) if the following first condition is satisfied:
            Voice_envelope_high_prio_duration<X−DDS_HIGH_PRIO_START<DDS_high_prio_duration
        Step 2: If no candidate is found in Step 1 for all nDDS SR occasions, select X based at least in part on a second condition:
    If      X−DDS_HIGH_PRIO_START<DDS_high_prio_duration
    Choose
      new_nDDS_HIGH_PRIO_START=DDS_HIGH_PRIO_START+(DDS_high_prio_duration−Voice_envelope_high_prio_duration)
    Else
      No change of DDS_HIGH_PRIO_START If the nDDS subscriber's SR periodicity is less than or equal to 20 ms, then the first condition is always satisfied. Only when the nDDS subscriber's SR periodicity is greater than 20 ms does the UE proceed to Step 2 to select X based at least in part on the SR offset. "delta_ms" can be pre-defined (such as in an extended file system (EFS)) or can be based at least in part on a single SIM estimated SR to PUSCH delay. "nDDS_SR_occasions" indicates a time associated with one or more SR occasions of the nDDS subscriber. "cycle_length" indicates a length of the time window of the UE. "HIGH_PRIO_START" indicates a start time of a high priority time window for a master subscriber. "new_nDDS_HIGH_PRIO_START" indicates a start time of a high priority time window for the nDDS subscriber. "DDS_HIGH_PRIO_START" indicates a start time of a high priority time window for the DDS subscriber. Voice_envelope_high_prio_duration indicates a length of a high priority time window for the nDDS subscriber, and DDS_high_prio_duration indicates a length of a high priority time window for the DDS subscriber.

In some aspects, the UE may determine the priority configuration and/or the master subscriber for a combination of services associated with a first subscriber and a second subscriber. For example, the UE may use the above-described conditions to select the master subscriber when a DDS subscriber is associated with active voice and gaming services, and an nDDS subscriber is associated with a non-voice service, a non-video telephony (VT) service, or a call on hold. As another example, the UE may use the above-described conditions to select the master subscriber when a DDS subscriber is associated with a call on hold and a gaming service and an nDDS subscriber is associated with a non-voice service. Thus, a duration of the higher priority time window for concurrent services without a voice service is biased towards a higher priority service and the DDS subscriber. The mapping of the priority configuration to slot level generation is based at least in part on a master subscriber selection. The master subscriber selection is based at least in part on the duration of the higher priority time window, a subscriber's status as DDS or nDDS, and the combination of services of the two subscribers.

In some aspects, the UE may switch the first priority and the second priority based at least in part on a type of communication. For example, the second SIM may determine to transmit a random access message, such as a physical random access channel (PRACH) message, during a lower priority time window of the second service. In this case, the UE (e.g., a lower layer of the UE, such as a medium access control (MAC) layer or a physical layer) may switch the first priority (e.g., the higher priority time window) and the second priority (e.g., the lower priority time window) so that the second SIM can transmit the random access message without the random access message being dropped due to conflict with a higher priority transmission of the first service. If both services of the UE initiate random access procedures, then a service associated with a higher priority may receive priority during the random access procedures. If a priority of a given service is unknown with regard to the random access procedure (e.g., if the priority for the random access procedure is unconfigured or unassigned), then the UE may prioritize transmission of whichever random access message arrives first (e.g., whichever random access procedure is initiated first, whichever random access message is provided to a lower layer for transmission first).

As indicated above, FIG. 5 is provided as an example. Other examples may differ from what is described with regard to FIG. 5.

Figure 6:
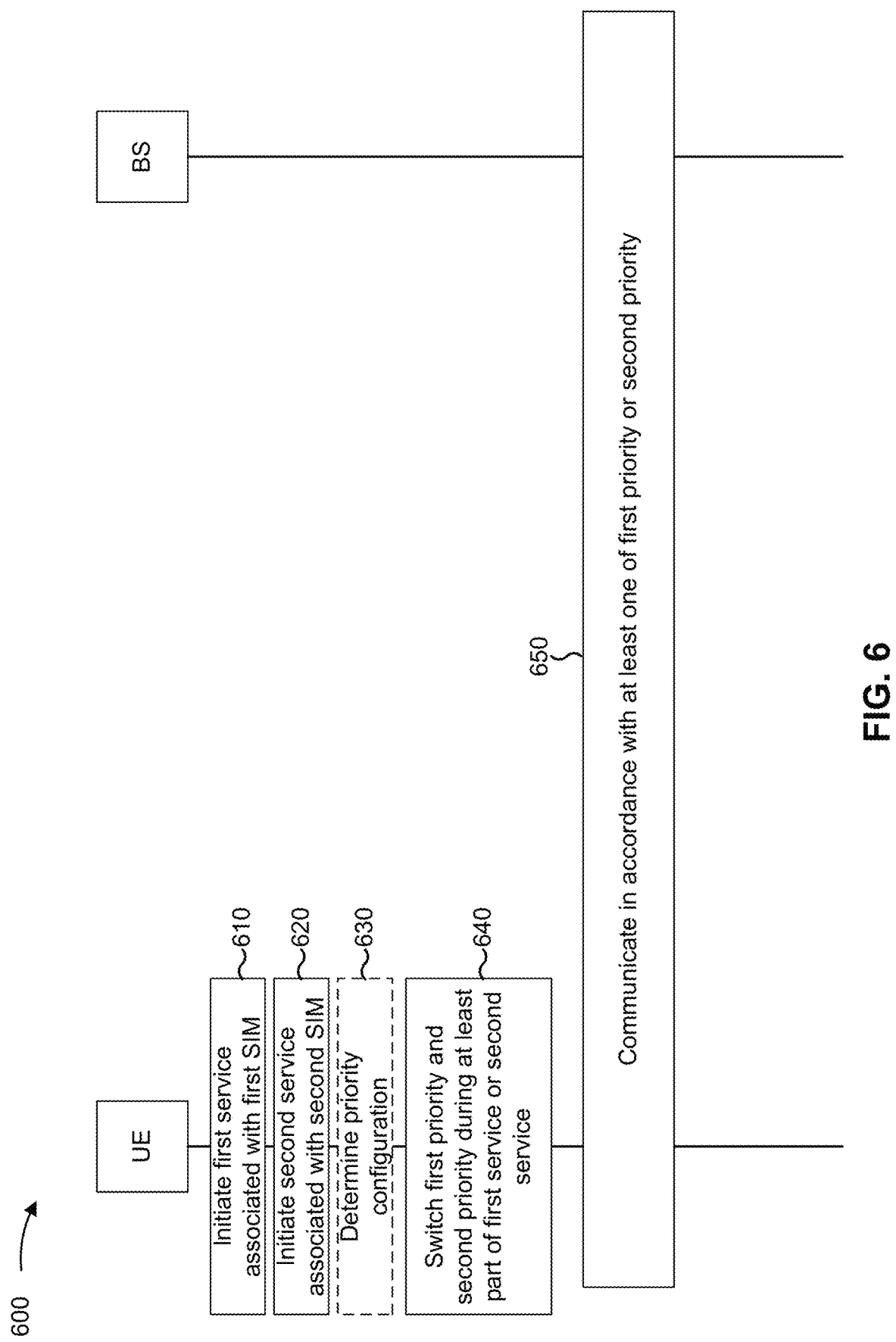
FIG. 6 is a diagram illustrating an example of signaling associated with a priority pattern for a DSDA UE, in accordance with the present disclosure.

FIG. 6 is a diagram illustrating an example 600 of signaling associated with a priority pattern for a DSDA UE, in accordance with the present disclosure. As shown, example 600 includes a UE (e.g., UE 120, the UE of FIG. 3, a DSDA UE) and a BS (e.g., BS 110). In some aspects, the BS of FIG. 6 may represent a plurality of BSs (e.g., BS 310*a* and 310*b*) and/or cells (e.g., cells 315*a* and 315*b*). In some aspects, the BS of FIG. 6 may represent one of BS 310*a* and 310*b* or cells 315*a* and 315*b*. Optional steps of example 600 are indicated by dashed lines.

As shown by reference number 610, the UE may initiate a first service associated with a first SIM of the UE. For example, the UE may establish a connection associated with the first service, may initiate a call associated with the first service, may initiate a session associated with the first service, or the like. In some aspects, the first service may be a voice service. If the first service is a voice service, the first service may be managed by an IMS component of the UE. In some aspects, the first service may be a non-voice service. For example, the first service may be a gaming service, a video telephony service, a data communication service, or the like. In some aspects, the first service may be associated with a first priority. The first SIM can be associated with a DDS or can be a non-DDS SIM.

As shown by reference number 620, the UE may initiate a second service associated with a second SIM of the UE. For example, the UE may establish a connection associated with the second service, may initiate a call associated with the second service, may initiate a session associated with the second service, or the like. In some aspects, the second service may be a voice service. If the second service is a voice service, the second service may be managed by an IMS component of the UE. In some aspects, the second service may be a non-voice service. For example, the second service may be a gaming service, a video telephony service, a data communication service, or the like. In some aspects, the second service may be associated with a second priority. The second SIM can be associated with a DDS or can be a non-DDS SIM.

As shown by reference number 630, the UE may determine a priority configuration. As described above, the priority configuration may indicate one or more higher priority time windows and one or more lower priority time windows within a time interval for the first service, and may indicate one or more higher priority time windows and one or more lower priority time windows within the time interval for the second service. In some aspects, the time interval may be periodic. In some aspects, the UE may determine the priority configuration in accordance with one or more of the techniques described with regard to FIGS. 4 and 5.

As shown by reference number 640, the UE may switch the first priority and the second priority during at least part of the first service or the second service. For example, the priority configuration may indicate a higher priority time window for the first service that corresponds to a lower priority time window for the second service, and a lower priority time window for the first service that corresponds to a higher priority time window for the second service. The UE may switch the priorities of the first service and the second service in accordance with the priority configuration. Thus, at different times within the time interval associated with the priority configuration, the UE prioritizes transmissions of the first service and of the second service. In this way, the length of time in which any given service's transmissions are deprioritized is reduced, thereby improving throughput and QoS requirement satisfaction, and reducing the likelihood of radio link failure for a deprioritized service. This may be particularly beneficial for services associated with predictable traffic patterns, such as a voice service managed by an IMS.

As shown by reference number 650, the UE may perform a communication in accordance with at least one of the first priority or the second priority. For example, the UE may transmit a communication associated with a higher priority time window. As another example, the UE may transmit a communication associated with a lower priority time window if the communication associated with the lower priority time window does not conflict with a communication associated with a higher priority time window. As used herein, "conflicting" refers to two communications that cannot both be transmitted by the UE due to a transmit resource limited state, such as based at least in part on full concurrency power sharing, transmitter sharing, or the like. As yet another example, the UE may transmit a random access message. For example, the UE may transmit a random access message irrespective of whether a service associated with the random access message is associated with a higher priority time window or a lower priority time window. As another example, the UE may transmit a random access message that conflicts with another random access message based at least in part on the random access message having higher priority than the other random access message. As yet another example, the UE may transmit a random access message that conflicts with another random access message based at least in part on the random access message arriving first (e.g., if both of the random access messages are associated with the same priority or if the priority of one or more of the random access messages is unknown).

In this way, a priority configuration (such as a micro priority pattern) for handling priority on resource sharing (e.g., based at least in part on voice activity through IMS control) for a DSDA scenario is provided. Thus, lower priority subscriber performance is improved with low impact on voice quality. Furthermore, the priority configuration for concurrent services (e.g., without voice) allows flexibility to control the performance tradeoff between two subscribers with different priority level combos. Still further, adjustment of the priority configuration's higher priority time window for DSDA with voice service based at least in part on tracking or estimation of retransmission status is provided, which allows early termination of the higher priority time window after voice transmission is complete, or extension of the higher priority time window to include retransmission of the voice transmission.

As indicated above, FIG. 6 is provided as an example. Other examples may differ from what is described with regard to FIG. 6.

Figure 7:
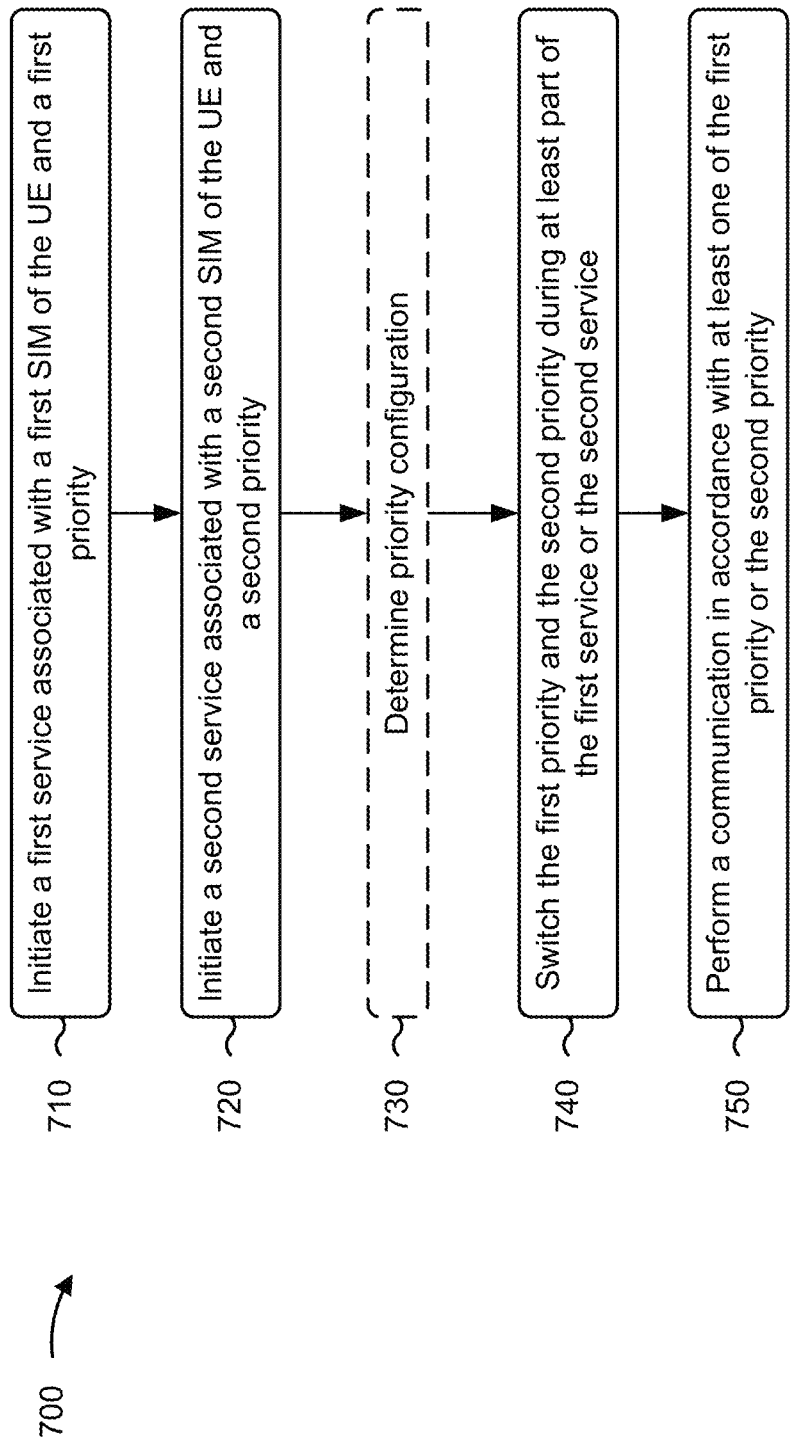
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with prioritizing communications for a dual subscriber UE.

As shown in FIG. 7, in some aspects, process 700 may include initiating a first service associated with a first SIM of the UE and a first priority (block 710). For example, the UE (e.g., using subscriber component 808, depicted in FIG. 8, or SIM 1 305*a*, depicted in FIG. 3) may initiate a first service associated with a first SIM of the UE and a first priority, as described above. The first SIM may be a DDS SIM or a non-DDS SIM.

As further shown in FIG. 7, in some aspects, process 700 may include initiating a second service associated with a second SIM of the UE and a second priority (block 720). For example, the UE (e.g., using subscriber component 808, depicted in FIG. 8, or SIM 2 305*b*, depicted in FIG. 3) may initiate a second service associated with a second SIM of the UE and a second priority, as described above. The second SIM may be a DDS SIM or a non-DDS SIM. For example, if the first SIM is a DDS SIM, the second SIM may be a non-DDS SIM, and vice versa.

As further shown in FIG. 7, in some aspects, process 700 may include determining a priority configuration (block 730). For example, the UE (e.g., using prioritization component 810, depicted in FIG. 8) may optionally determine a priority configuration, as described above. The priority configuration may indicate a high priority time window and a low priority time window for the first service and a high priority time window and a low priority time window for the second service. The determination of the priority configuration (such as based on which service, if any, is a voice service, timing of voice packets, retransmission status, the first priority and/or the second priority, or the like) is described elsewhere herein.

As further shown in FIG. 7, in some aspects, process 700 may include switching the first priority and the second priority during at least part of the first service or the second service (block 740). For example, the UE (e.g., using prioritization component 810, depicted in FIG. 8) may switch the first priority and the second priority during at least part of the first service or the second service, as described above.

As further shown in FIG. 7, in some aspects, process 700 may include performing a communication in accordance with at least one of the first priority or the second priority (block 750). For example, the UE (e.g., using transmission component 804, depicted in FIG. 8) may perform a communication in accordance with at least one of the first priority or the second priority, as described above.

Process 700 may include additional aspects, such as any single aspect or any combination of aspects described below and/or in connection with one or more other processes described elsewhere herein.

In a first aspect, switching the first priority and the second priority is based at least in part on the first service being a voice service, and a time window of the first priority (e.g., a higher priority time window for the first service) is configured to include a transmission time of a packet for the voice service.

In a second aspect, alone or in combination with the first aspect, the time window of the first priority is based at least in part on information regarding the voice service provided by an Internet Protocol multimedia subsystem component of the UE.

In a third aspect, alone or in combination with one or more of the first and second aspects, switching the first priority and the second priority is based at least in part on the first service being a voice service, and process 700 includes modifying a duration of a time window of the first priority (e.g., a higher priority time window of the first service) based at least in part on HARQ feedback regarding the voice service.

In a fourth aspect, alone or in combination with one or more of the first through third aspects, the duration of the time window is lengthened to include a retransmission of a communication associated with the first SIM.

In a fifth aspect, alone or in combination with one or more of the first through third aspects, the duration of the time window is shortened based at least in part on a communication associated with the first SIM being an initial transmission.

In a sixth aspect, alone or in combination with one or more of the first through fifth aspects, the first service is prioritized over the second service based at least in part on the first priority being higher than the second priority and based at least in part on neither of the first service and the second service being voice services.

In a seventh aspect, alone or in combination with one or more of the first through sixth aspects, based at least in part on the first priority being higher than the second priority, a time window associated with the first priority (e.g., a higher priority time window for the first service) and a time window associated with the second priority (e.g., a lower priority time window for the first service) are selected based at least in part on times of transmissions associated with the first service.

In an eighth aspect, alone or in combination with one or more of the first through seventh aspects, a time window associated with the first priority occupies a greater period of a time interval associated with the first service or the second service than a time window associated with the second priority based at least in part on the priority being higher than the second priority.

In a ninth aspect, alone or in combination with one or more of the first through eighth aspects, switching the first priority and the second priority is based at least in part on the first service being associated with a default data SIM of the UE.

In a tenth aspect, alone or in combination with one or more of the first through ninth aspects, the first time window and the second time window occupy equal portions of a period of the priority pattern based at least in part on the first priority and the second priority being equal to each other.

In an eleventh aspect, alone or in combination with one or more of the first through tenth aspects, process 700 includes transmitting a random access message, associated with the second SIM, during a time window associated with the first priority.

In a twelfth aspect, alone or in combination with one or more of the first through eleventh aspects, the second priority is higher than the first priority, and the random access message associated with the second SIM is prioritized over a concurrent random access message associated with the first SIM.

In a thirteenth aspect, alone or in combination with one or more of the first through twelfth aspects, the random access message associated with the second SIM is prioritized over a concurrent random access message associated with the first SIM based at least in part on a priority of the random access message associated with the second SIM being unknown, and based at least in part on the random access message associated with the second SIM arriving before the random access message associated with the first SIM.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
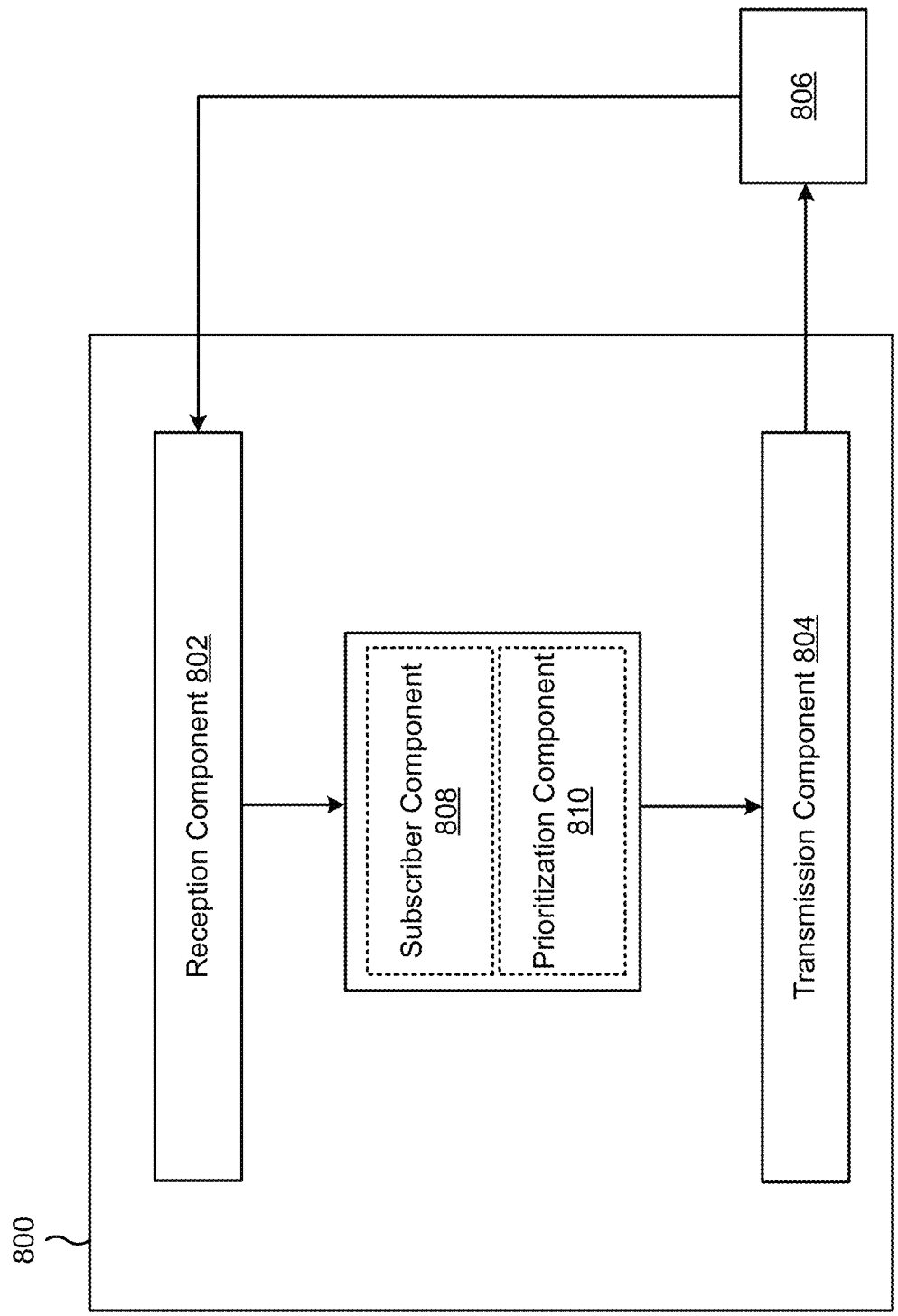
FIG. 8 is a block diagram of an example apparatus for wireless communication, in accordance with the present disclosure.

FIG. 8 is a block diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a subscriber component 808 or a prioritization component 810, among other examples.

In some aspects, the apparatus 800 may be configured to perform one or more operations described herein in connection with FIGS. 3-6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The subscriber component 808 may initiate a first service associated with a first SIM of the UE and a first priority. The subscriber component 808 may initiate a second service associated with a second SIM of the UE and a second priority. The subscriber component 808 may include, for example, SIM 1 305a and SIM 2 305b of FIG. 3. The prioritization component 810 may switch the first priority and the second priority during at least part of the first service or the second service. In some aspects, the prioritization component 810 may be implemented in a lower layer of the apparatus 800, such as a MAC layer, a physical layer, or the like. The transmission component 804 may perform a communication in accordance with at least one of the first priority or the second priority. In some aspects, the transmission component 804 may transmit a random access message, associated with the second SIM, during a time window associated with the first priority.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: initiating a first service associated with a first subscriber identity module (SIM) of the UE and a first priority; initiating a second service associated with a second SIM of the UE and a second priority; switching the first priority and the second priority during at least part of the first service or the second service; and performing a communication in accordance with at least one of the first priority or the second priority.

Aspect 2: The method of Aspect 1, wherein switching the first priority and the second priority is based at least in part on the first service being a voice service, and wherein a time window of the first priority is configured to include a transmission time of a packet for the voice service.

Aspect 3: The method of Aspect 2, wherein the time window of the first priority is based at least in part on information regarding the voice service provided by an Internet Protocol multimedia subsystem of the UE.

Aspect 4: The method of any of Aspects 1-3, wherein switching the first priority and the second priority is based at least in part on the first service being a voice service, and wherein the method further comprises: modifying a duration of a time window of the first priority based at least in part on hybrid automatic repeat request (HARQ) feedback regarding the voice service.

Aspect 5: The method of Aspect 4, wherein the duration of the time window of the first priority is lengthened to include a retransmission of a communication associated with the first SIM.

Aspect 6: The method of Aspect 4, wherein the duration of the time window of the first priority is shortened based at least in part on a communication associated with the first SIM being an initial transmission.

Aspect 7: The method of Aspect 1, wherein the first service is prioritized over the second service based at least in part on the first priority of the first service being higher than the second priority of the second service and based at least in part on neither of the first service and the second service being voice services.

Aspect 8: The method of Aspect 7, wherein, based at least in part on the first priority being higher than the second priority, a time window associated with the first priority for the first service and a time window associated with the second priority for the first service are selected based at least in part on times of transmissions associated with the first service.

Aspect 9: The method of Aspect 6, wherein, for the first service or the second service, a time window associated with the first priority occupies a greater period of a time interval associated with the first service or the second service than a time window associated with the second priority based at least in part on the priority being higher than the second priority.

Aspect 10: The method of any of Aspects 1-9, further comprising determining a priority configuration for the first service and the second service based at least in part on the first service being associated with a default data SIM of the UE.

Aspect 11: The method of Aspect 10, wherein a time window associated with the first priority and a time window associated with the second priority occupy equal portions of a period of a time interval associated with the first service or the second service based at least in part on the first priority and the second priority being equal to each other.

Aspect 12: The method of any of Aspects 1-11, further comprising: transmitting a random access message, associated with the second SIM, during a time window associated with the first priority.

Aspect 13: The method of Aspect 12, wherein the second priority is higher than the first priority, and wherein the random access message associated with the second SIM is prioritized over a concurrent random access message associated with the first SIM.

Aspect 14: The method of one of Aspect 12 or 13, wherein the random access message associated with the second SIM is prioritized over a concurrent random access message associated with the first SIM based at least in part on a priority of the random access message associated with the second SIM being unknown, and based at least in part on the random access message associated with the second SIM arriving before the random access message associated with the first SIM.

Aspect 15: The method of any of Aspects 1-12, wherein switching the first priority and the second priority is based at least in part on a priority configuration indicating one or more first priority time windows and one or more second priority time windows within a time interval for the first service; and one or more first priority time windows and one or more second priority time windows within a time interval for the second service.

Aspect 16: The method of any of Aspects 1-15, wherein the first priority is a higher priority than the second priority.

Aspect 17: The method of any of Aspects 15-16, wherein the priority configuration further indicates: the one or more first priority time windows for the first service correspond to the one or more second priority time windows for the second service; and the one or more second priority time windows for the first service correspond to the one or more first priority time windows for the second service.

Aspect 18: The method of any of Aspects 1-17, further comprising determining the priority configuration based at least in part on a master subscriber selected from the first SIM and the second SIM.

Aspect 19: The method of Aspect 18, wherein the master subscriber is associated with the first SIM, and wherein the one or more first priority time windows occur when packets associated with the first service are to be transmitted.

Aspect 20: The method of any of Aspects 18-19, wherein the master subscriber is associated with a lower priority of the first priority and the second priority.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the memory and the one or more processors configured to perform the method of one or more Aspects of Aspects 1-20.

Aspect 23: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      initiate a first service associated with a first subscriber identity module (SIM) of the UE;
      initiate a second service associated with a second SIM of the UE;
      switch priorities of the first service and the second service while the first service and the second service are active, wherein the first service has a first time window having a first priority and a second time window having a second priority, and wherein the second service has a third time window having the second priority and a fourth time window having the first priority; and perform a communication in accordance with the priorities of the first service and the second service.

2. The UE of claim 1, wherein the first service is a voice service, and wherein a time window for the voice service is configured to include a transmission time of a packet for the voice service.

3. The UE of claim 2, wherein the time window for the voice service is based at least in part on information regarding the voice service provided by an Internet Protocol multimedia subsystem of the UE.

4. The UE of claim 1, wherein the first service is a voice service, and wherein the one or more processors are configured to:

modify a duration of a time window for the voice service based at least in part on hybrid automatic repeat request (HARQ) feedback regarding the voice service.

5. The UE of claim 4, wherein the duration of the time window for the voice service is lengthened to include a retransmission of a communication associated with the first SIM.

6. The UE of claim 4, wherein the duration of the time window for the voice service is shortened based at least in part on a communication associated with the first SIM being an initial transmission.

7. The UE of claim 1, wherein the first service is prioritized over the second service based at least in part on neither of the first service and the second service being voice services.

8. The UE of claim 7, wherein the first time window and the second time window are selected based at least in part on times of transmissions associated with the first service.

9. The UE of claim 7, wherein the fourth time window occupies a greater period of a time interval than the third time window.

10. The UE of claim 1, wherein the one or more processors are further configured to determine a priority configuration for the first service and the second service based at least in part on the first service being associated with a default data SIM of the UE.

11. The UE of claim 1, wherein the first time window and the second time window occupy equal portions of a period of a time interval associated with the first service based at least in part on the priorities of the first service and the second service being equal to each other.

12. The UE of claim 1, wherein the one or more processors are further configured to:

transmit a random access message, associated with the second SIM, during a time window associated with the second service.

13. The UE of claim 12, wherein the random access message associated with the second SIM is prioritized over a concurrent random access message associated with the first SIM.

14. The UE of claim 12, wherein the random access message associated with the second SIM is prioritized over a concurrent random access message associated with the first SIM based at least in part on a priority of the random access message associated with the second SIM being unknown, and based at least in part on the random access message associated with the second SIM arriving before the random access message associated with the first SIM.

15. The UE of claim 1, wherein switching the priorities of the first service and the second service comprises:

switching the first time window from the first priority to the second priority;

switching the second time window from the second priority to the first priority;

switching the third time window from the second priority to the first priority; and switching the fourth time window from the first priority to the second priority.

16. The UE of claim 1, wherein the first service is associated with a higher priority than the second service before the switch.

17. The UE of claim 1, wherein a priority configuration indicates:

the first time window corresponds to the third time window; and the second time window corresponds to the fourth time window.

18. The UE of claim 1, wherein the one or more processors are further configured to:

determine a priority configuration of at least one of the first service or the second service based at least in part on a master subscriber selected from the first SIM and the second SIM.

19. The UE of claim 18, wherein the master subscriber is associated with the first SIM.

20. The UE of claim 18, wherein the master subscriber is associated with a lower priority service of the first service and the second service.

21. A method of wireless communication performed by a user equipment (UE), comprising:

initiating a first service associated with a first subscriber identity module (SIM) of the UE;

initiating a second service associated with a second SIM of the UE;

switching priorities of the first service and the second service while the first service and the second service are active, wherein the first service has a first time window having a first priority and a second time window having a second priority, and wherein the second service has a third time window having the second priority and a fourth time window having the first priority; and performing a communication in accordance with the priorities of the first service and the second service.

22. The method of claim 21, wherein the first service is a voice service, and wherein a time window for the first service is configured to include a transmission time of a packet for the voice service.

23. The method of claim 22, wherein the time window for the first service is based at least in part on information regarding the voice service provided by an Internet Protocol multimedia subsystem of the UE.

24. The method of claim 21, wherein the first service is a voice service, and wherein the method further comprises:

modifying a duration of a third time window for the first service based at least in part on hybrid automatic repeat request (HARQ) feedback regarding the voice service.

25. The method of claim 24, wherein the duration of the third time window for the first service is lengthened to include a retransmission of a communication associated with the first SIM.

26. The method of claim 24, wherein the duration of the third time window for the first service is shortened based at least in part on a communication associated with the first SIM being an initial transmission.

27. The method of claim 21, wherein the first service is prioritized over the second service based at least in part on neither of the first service and the second service being voice services.

28. The method of claim 27, wherein the first time window and the second time window are selected based at least in part on times of transmissions associated with the first service.

29. A non-transitory computer-readable medium storing a set of instructions for wireless communication, the set of instructions comprising:
one or more instructions that, when executed by one or more processors of a user equipment (UE), cause the UE to:
initiate a first service associated with a first subscriber identity module (SIM) of the UE;
initiate a second service associated with a second SIM of the UE;
switch priorities of the first service and the second service while the first service and the second service are active,
wherein the first service has a first time window having a first priority and a second time window having a second priority, and
wherein the second service has a third time window having the second priority and a fourth time window having the first priority; and
perform a communication in accordance with the priorities of the first service and the second service.

30. An apparatus for wireless communication, comprising:
means for initiating a first service associated with a first subscriber identity module (SIM) of the apparatus;
means for initiating a second service associated with a second SIM of the apparatus;
means for switching priorities of the first service and the second service while the first service and the second service are active,
wherein the first service has a first time window having a first priority and a second time window having a second priority, and
wherein the second service has a third time window having the second priority and a fourth time window having the first priority; and
means for performing a communication in accordance with the priorities of the first service and the second service.

* * * * *